United States Patent [19]

Habermann et al.

[11] 4,012,083

[45] Mar. 15, 1977

[54] MAGNETIC BEARINGS

[75] Inventors: Helmut Habermann, Vernon; Maurice Brunet, Foret de Vernon, both of France

[73] Assignee: Societe Anonyme dite: Societe Europeenne de Propulsion, Puteaux, France

[22] Filed: May 5, 1975

[21] Appl. No.: 574,690

[30] Foreign Application Priority Data

May 9, 1974 France .......................... 74.16080

[52] U.S. Cl. ................................ 308/10
[51] Int. Cl.² ..................... F16C 39/00
[58] Field of Search ............... 308/10; 74/5.41, 5.6

[56] References Cited

UNITED STATES PATENTS

| | | | |
|---|---|---|---|
| 3,209,152 | 9/1965 | Brouwer | 308/10 |
| 3,384,427 | 5/1968 | McHugh | 308/10 |
| 3,523,715 | 8/1970 | Sixsmith | 308/10 |
| 3,612,630 | 10/1971 | Rosensweig | 308/10 |
| 3,787,100 | 1/1974 | Habermann | 308/10 |
| 3,865,442 | 2/1975 | Studer | 308/10 |
| 3,890,019 | 6/1975 | Boden | 308/10 |
| 3,909,082 | 9/1975 | Ishikawa | 308/10 |
| 3,937,533 | 2/1976 | Veillette | 308/10 |

FOREIGN PATENTS OR APPLICATIONS

| | | | |
|---|---|---|---|
| 2,133,209 | 1/1973 | Germany | 308/10 |
| 422,844 | 6/1947 | Italy | 308/10 |

*Primary Examiner*—R. Skudy
*Attorney, Agent, or Firm*—Bacon & Thomas

[57] ABSTRACT

This invention relates to magnetic bearings and particularly to active magnetic bearings having a very low "friction couple". In accordance with the invention the active magnetic bearing is of the type which has a stator formed by an electromagnetic circuit having at least one pair of north and south poles, and wherein said electromagnetic circuit of said stator includes at least one electromagnet of U-shaped section. The arms of said U form north pole and south poles respectively and the electromagnet is so arranged that the plane of symmetry which separates the north pole from the south pole lies perpendicularly to the axis of rotation of the magnetic bearing.

2 Claims, 2 Drawing Figures

MAGNETIC BEARINGS

BACKGROUND OF THE INVENTION

The present invention relates to magnetic bearings and particularly to active magnetic bearings having a very low "friction" couple.

An "active" magnetic bearing is made up of at least: a displacement detector, an electronic control unit, and an electromagnet. Any displacement sensed by the detector is counteracted by a servo-system which sets up opposing magnetic forces by means of the electromagnet. An active magnetic bearing is disclosed in, inter alia, U.S. Pat. No. 3,787,100. Such magnetic bearings generally incorporate a stator formed by an electromagnetic circuit having at least one pair of north and south poles. A rotor is mounted in the said magnetic bearing and the lines of force in the magnetic circuit induced in the stator close in a magnetic part of the rotor, which part is situated opposite the said stator.

However, although such magnetic bearings confer very great advantages whenever it is desired to have such a rotor turn at an extremely high speed, due to the fact that they allow any possibility of mechanical friction to be eliminated as a result of the absence of contact between the rotor and the stator, nevertheless they are still subject to various physical phenomena which, although not of mechanical origin, still have a retarding effect on the rotation of the rotor and for this reason will be referred to by analogy as friction.

This friction, which may detract greatly from the satisfactory operation of the magnetic bearing, has two main physical origins: on the one hand, losses due to eddy currents induced in the rotor and on the other hand hysteresis-effect losses due to the change in the magnetic field induced in the rotor and the stator. Eddy current losses can be reduced in a known way by using thin metal plates having high resistivity.

It is therefore an object of the invention to provide a magnetic bearing of the type which has a stator formed by an electromagnetic circuit having at least one pair of north and south poles, in which bearing the couples produced by hysteresis-effect friction are reduced to a minimum or are very appreciably reduced in comparison with those which exist in known magnetic bearings since they may be reduced by a factor of the order of 10 or even more.

SUMMARY OF THE INVENTION

The invention consists in an active magnetic bearing of the type which has at least one pair of north and south poles, which bearing is characterised in that the electromagnetic circuit of the stator includes at least one electromagnet of U-shaped cross-section with the arms of the U forming north and south poles respectively, said electromagnet being so arranged that the plane of symmetry which separates the said north pole from the said south pole lies perpendicular to the axis of rotation of the said magnetic bearing.

This demonstrates a first advantage of the present invention, which lies in the fact that, since the line joining the north and south poles is parallel to the axis of rotation of the magnetic bearing, and thus to the axis of rotation of the rotor, one and the same part of the rotor does not pass in front of the said north pole and the said south pole in succession. It follows that the hysteresis cycle through which the magnetic field at each point on the rotor is taken each time the said point passes in front of one of the said poles extends only between the values O and +B, with +B corresponding to the maximum flux density generated by the said pole (or between O and −B in the case of a pole of the opposite kind) rather than from −B to +B as was the case when both the poles, one north and one south, making up one and the same pair acted successively on the same part of the rotor as it rotated.

Thus, the area of the magnetic hysteresis loop for this cycle is reduced by a factor of three to four, which means an equivalent reduction in the losses attendant on the hysteresis effect.

Furthermore, another advantage of the present invention lies in the fact that the lines of force in the rotor which link the parts of the rotor situated opposite the north and south poles respectively follow substantially constant paths and in producing the rotor it becomes possible to use plates having an orientated granular texture, which enables the hysteresis losses to be further reduced by factor of at least three.

Other features and advantages of the present invention will become apparent from perusal of the following description of an embodiment of the proposed magnetic bearing, which is given as a non-limiting example.

BRIEF DESCRIPTION OF THE DRAWINGS

In order that the invention may be more clearly understood, reference will now be made to the accompanying drawings which show one embodiment thereof by way of example and in which.

DETAILED DESCRIPTION OF A PREFERRED EMBODIMENT

Figure 1:
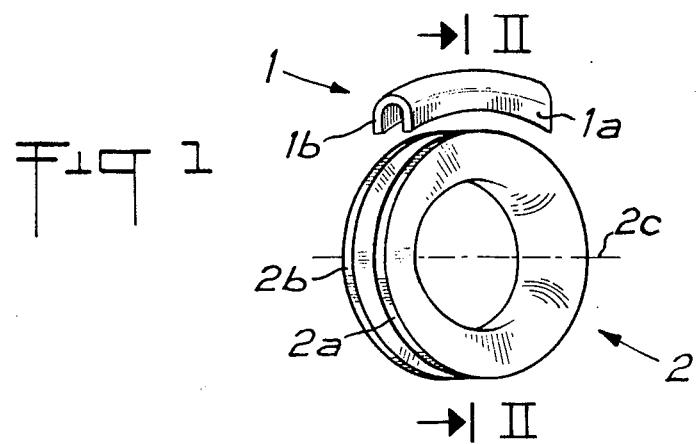
FIG. 1 is a schematic perspective view of the main parts of a magnetic bearing according to the invention and a rotor mounted in such bearing.
Figure 2:
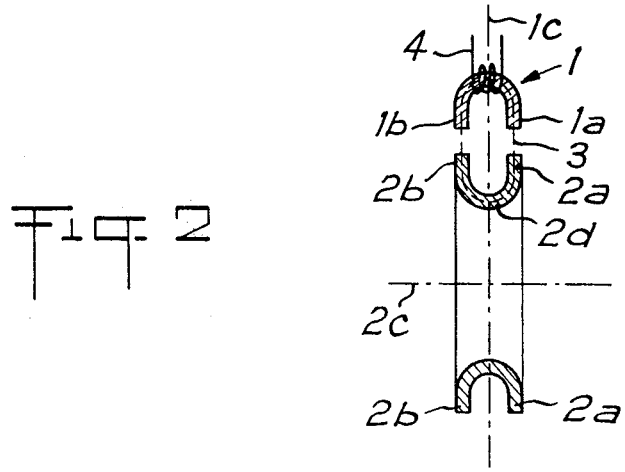
FIG. 2 is an axial cross-section through the bearing and rotor of FIG. 1 taken along line II—II.

As can be seen from FIG. 1, the magnetic bearing according to the invention consists in essence of a stator formed by at least one electromagnet 1. As can be seen in FIG. 2 in cross-section this electromagnet 1 is in the form of a U of which the two arms 1a and 1b form north and south poles respectively.

A rotor 2 is mounted in this magnetic bearing and revolves about a substantially stationary axis of revolution 2c.

The invention resides chiefly in the fact that the U-shaped electromagnet 1 is so arranged that its plane of symmetry 1c which separates the arm 1a forming its north pole from the arm 1b forming its south pole lies perpendicular to the stationary axis 2c about which the rotor 2 rotates in the magnetic bearing. Thus, the gap which separates the north pole of the electromagnet 1 from its south pole is parallel to the axis 2c of rotation of rotor 2.

Near the electromagnet 1 and facing it the rotor 2 has a part whose shape is that of the body of revolution produced by revolving a U-shaped FIG. 2d, whose shape is substantially the same as the cross-sectional shape of the electromagnet 1, about the stationary axis 2c. The cross-section of the figure can be seen in FIG. 2 and it likewise has two arms 2a and 2b which are situated opposite, and lie on extensions of, arms 1a and 1b respectively of electromagnet 1.

This part of the rotor 2 situated near the electromagnet 1 is, preferably, formed from thin laminated plates the laminations of which are very close together.

In this way, the lines of force 3 in the electromagnetic circuit, which is induced in a known way in the electromagnet 1 by a coil 4 wound around the latter, close in the U-shaped part of the rotor 2 which connects the two arms 2a and 2b.

It is thus clear that for the whole circumference of the rotor 2, the part of it which corresponds to the arm 2a will only ever be magnetised by a north pole (1a) whereas on the other hand the part of the rotor 2 which corresponds to arm 2b will, round the whole of its circumference, be magnetised only by a south pole (1b).

It can thus be seen that, since the direction of the lines of force remains substantially the same at all points of the rotor 2, it now becomes possible to use laminated plates having an orientated granular texture to produce the magnetic part of the said rotor 2, which was certainly not possible previously since the direction of orientation of the magnetic field at each point of the rotor would change alternately depending upon whether the said point was passing in front of a north pole or a south pole.

It will, of course, be understood that the embodiment described above is given as a purely illustrative example and that it would be possible to make any modifications which might be desired without thereby departing from the scope of the invention as defined by the accompanying claims.

In particular it is possible to arrange around the rotor 2 any number of electromagnets similar to the electromagnet 1 which figures in the present description, and in particular an even number of electromagnets 1, such as 2, 4, 8 or even more, this number being one of the numbers in the geometric progression represented by the general expression $u_n = 2^n$ where $n$ is a whole number.

We claim:

1. A device including a rotor rotatable about an axis and an active magnetic bearing magnetically supporting said rotor for rotation, said magnetic bearing having a stator defining an electromagnetic circuit including at least one electromagnet which, when energized, has a pair of fixed north and south poles, said electromagnet having a U-shaped cross section in a plane including said axis of rotation of the rotor and opening towards said axis of rotation, the parallel extending side portions of said electromagnet forming respectively said fixed north and south poles and being separated by a plane of symmetry which lies perpendicular to said axis of rotation;

said rotor having a circumference in the shape of an annulus whose cross section is in the shape of a U, the legs of which radially aligned to face said side portions of said electromagnet.

2. A device according to claim 1 wherein the part of the rotor, wherein the lines of force of the electromagnetic field induced by said at least one electromagnet close, is made of grain-oriented laminated plates.

* * * * *